United States Patent [19]
Carson et al.

[11] Patent Number: 6,065,925
[45] Date of Patent: May 23, 2000

[54] APPARATUS AND METHOD FOR HANDLING LIDS

[75] Inventors: David E. Carson; Darrell B. Johnson; Donald L. Powell, all of Fort Collins, Colo.

[73] Assignee: CBW Automation, Inc., Fort Collins, Colo.

[21] Appl. No.: 09/237,076

[22] Filed: Jan. 25, 1999

Related U.S. Application Data

[62] Division of application No. 08/725,066, Oct. 2, 1996, Pat. No. 5,863,177.

[51] Int. Cl.[7] .............................. B25J 15/06; B65G 65/02
[52] U.S. Cl. .............................. 414/627; 294/65; 414/800
[58] Field of Search ............................... 294/65; 53/532, 53/534, 542; 414/627, 793; 800/796.2

[56] References Cited

U.S. PATENT DOCUMENTS

| | | | |
|---|---|---|---|
| 2,862,633 | 12/1958 | Stiles | 414/627 X |
| 2,880,030 | 3/1959 | Horn | 294/65 |
| 3,523,707 | 8/1970 | Roth | 294/65 |
| 4,787,812 | 11/1988 | Göpfert | 294/65 X |
| 5,105,606 | 4/1992 | Creed et al. | 53/499 |
| 5,222,861 | 6/1993 | Focke et al. | 414/796.2 |
| 5,611,193 | 3/1997 | Farrelly | 53/475 |

*Primary Examiner*—Janice L. Krizek
*Attorney, Agent, or Firm*—William E. Hein

[57] ABSTRACT

A lid handling system employs a lid alignment assembly for aligning lids randomly placed on a rotating input disc, a lid separation assembly for separating lids spinning on a pair of horizontal spin bars into a counted stack, a vacuum pickup assembly for picking up a counted stack of lids, a pick and place assembly for transporting and placing stacks of lids into trays having upwardly bent side members, and a conveyor for conveying filled trays toward a carton.

3 Claims, 11 Drawing Sheets

APPARATUS AND METHOD FOR HANDLING LIDS

This is a divisional of Ser. No. 08/725,066 filed Oct. 2, 1996 now U.S. Pat. No. 5,863,177.

BACKGROUND AND SUMMARY OF THE INVENTION

This invention relates generally to lid handling systems. Lids are typically received from production facilities in a randomly oriented manner and are destined for use in the medical, food service, and toy industries. It is therefore necessary that these lids be single-filed, oriented, stacked, counted, and placed into a carton for shipping without disturbing the counted stacks. Single-filing, orienting, and stacking operations have been automated in the prior art. However, these prior art systems are limited in terms of the number of lids per minute that can be handled. Today's high speed production operations require higher lid handling rates. Manually counting and placing lids into a carton is labor intensive and also slow.

Single-filing of the lids has commonly been accomplished by using the centrifugal force of a horizontally positioned rotary disc to first move lids to the outside circumference of the disc. A single, flat lid may then exit the disc through a slot that is the same height as the lid. Lids that are positioned on top of each other can occasionally jam in the slot and completely stop production. Even if a jam does not occur, two lids attempting to exit the slot together tend to hesitate before moving downstream from the slot. This situation can dramatically reduce the throughput of the lid handling system.

Additionally, lids must be channeled into one or more lanes. After exiting the slot, existing systems use a stationary guide to route the lids into one or more lanes. Lids that do not directly enter a lane, but instead impact the stationary guide, can cause stoppages or hesitation in the flow of lids.

After being routed into lanes, lids must be stacked horizontally and separated into counted stacks. Stacking has historically been accomplished by utilizing horizontal spin bars. The difficulty of separating lids into a counted, horizontal stack arises because the lids are spinning, and variations in the lids can change the location of the seam between adjacent lids. Sweep motion devices have been used in the past to accomplish lid separation. These devices typically do not reliably locate the seam in the stacks of lids, thus disturbing the stacks and frequently knocking some lids off the horizontal spin bars.

After lids are counted into stacks, the stacks must then be moved without disturbing their alignment in order to place them into a carton. This is difficult because lids frequently fit together with an interference of only a few thousandths of an inch. If the integrity of the stack is not maintained, individual lids may warp during shipment, rendering them unusable. No method has yet been devised to move stacks of lids reliably. The prior art method of handling stacks of lids is to manually place them into a carton. Placing a counted stack directly into a carton is difficult because the carton tolerance must be tight to maintain stack alignment during shipping. Frequently, a plastic liner placed in the carton snags lids that are located on the ends of each stack, thereby resulting in mis-alignment of the stack. When one layer of stacked lids is placed into a carton, a piece of cardboard is manually placed over that layer of lids, and another layer of stacked lids is added. This process is repeated until the carton is filled, but since each stack must be handled manually, labor costs are high, and the potential for contamination exists.

It is therefore the principal object of the present invention to provide an improved lid handling system having increased output, while reducing stoppage and labor costs.

This and other objects are accomplished in accordance with the illustrated preferred embodiment of the present invention by providing a lid alignment assembly, a lid separation assembly, and a vacuum pickup assembly.

The lid alignment assembly of the present invention eliminates stoppages at the input end of the system by replacing the traditional lid exit slot with a horizontally positioned moving belt located one lid height above a horizontal rotating disc. Any lids positioned on top of each other will contact the moving belt and be moved by the belt away from the lid exit slot.

After lids exit the rotating disc through the lid exit slot, a secondary stoppage can occur when lids impact a stationary guide that defines the single lane at the output of the rotating disc. This stoppage problem is eliminated in accordance with the present invention by locating a rotating wheel at the impact point of the stationary guide. This wheel will force each lid to either move into the output lane or back onto the rotating disc to be recycled.

Separating lids into counted stacks without knocking off the conventional rotating spin bars is accomplished by replacing prior art separating devices with a beveled separating wheel that is mounted for free wheeling and sliding movement on a shaft. When the separating wheel is lowered into contact with a stack of spinning lids, it will in turn begin to spin with a circumferential speed equal to that of the lids. If the shaft on which the separating wheel is mounted is angled both upwards and sideways with respect to the stack of lids, the separating wheel will be forced to move parallel to the stack of lids until it contacts a seam between two lids. This will allow an accurate separation into stacks of a desired length without knocking lids off of the spin bars.

Transporting counted stacks of lids is accomplished by lifting each stack from above using the vacuum pickup assembly that has length and width dimensions approximately equal to the stacks of lids. The vacuum pickup assembly is arranged to be mechanically lowered into near contact with the spinning stacks of lids. Vacuum ports on the underside of the vacuum pickup assembly serve to lift the spinning stacks of lids into associated stack receivers. A flexible, low-friction fabric material attached to each of the stack receivers serves to seal the vacuum without disturbing the stacks of lids. The result is that the stacks of lids will be pulled upward off the spin bars and the spinning stopped without disturbing lid alignment. Since the peripheral edge of each lid is firmly held by vacuum, the stacks of lids can then be transported without disrupting the lid alignment.

Lid handling labor and the opportunity for contamination can be reduced by automatically placing the stacks of lids onto a holding tray that can retain an entire layer of stacks of lids. The bottom of each tray serves as a divider between layers when placed into the carton. Each tray includes an upwardly bent flap on each end that contacts, holds, and protects the end lids of each stack. An additional problem that is overcome by the present invention exists when the number of stacks of lids that are transported by the vacuum pickup assembly is not the same number required to fill each tray. By placing trays adjacent to each other, the vacuum pickup assembly places the stacks of lids into trays as required. While conveying a filled tray, an external guide holds the end flaps in position to provide pressure on each stack, thereby maintaining stack alignment. The entire tray can then be placed into a carton, either manually or automatically. In either instance, labor is reduced, stack alignment is maintained by protecting the end lids of each stack from the plastic carton liner, and potential contamination is reduced by eliminating manual handling of each individual stack of lids.

DETAILED DESCRIPTION OF THE PREFERRED EMBODIMENT

Figure 1:
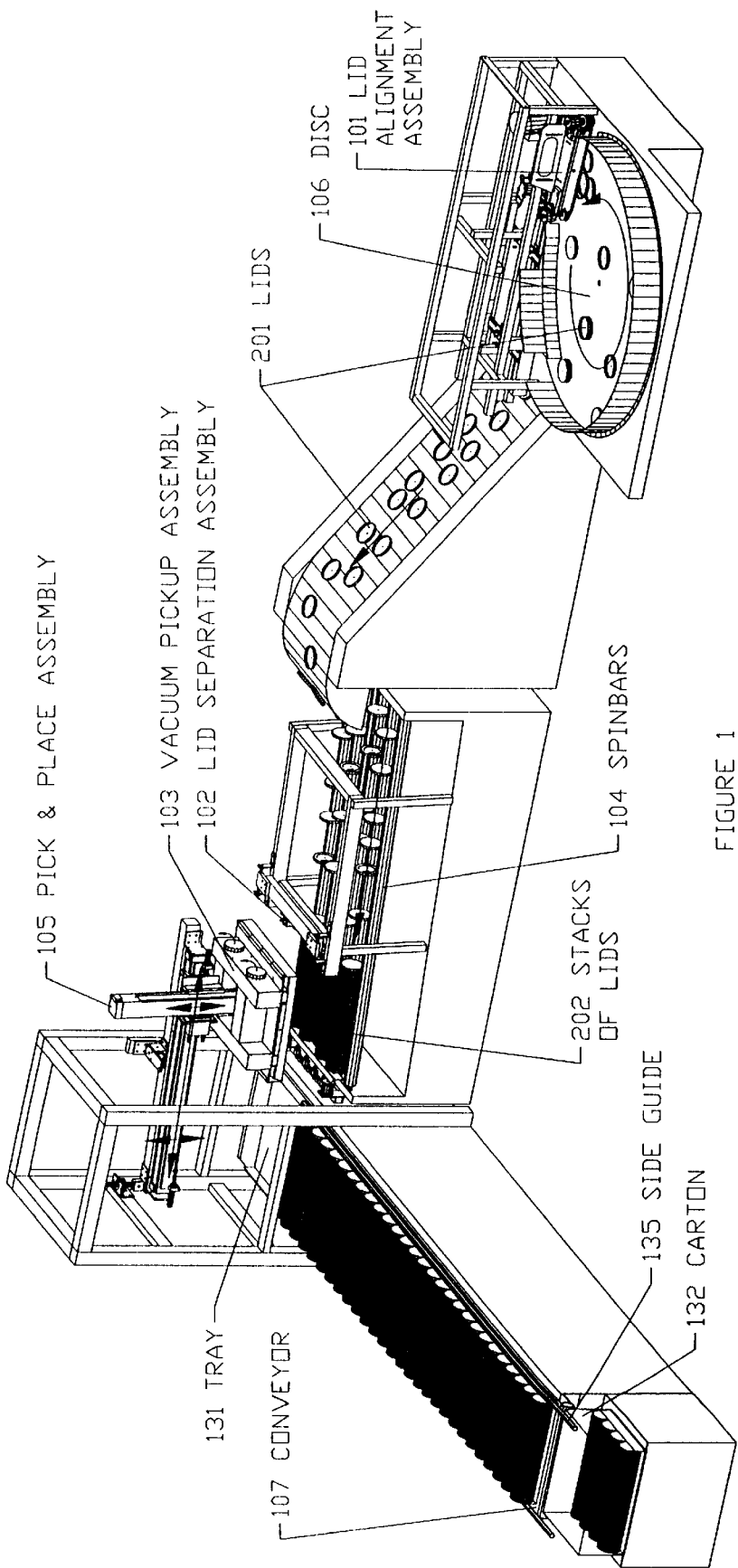
FIG. 1 is an overall pictorial diagram of the lid handling system of the present invention.

Referring now generally to FIG. 1, there is shown a lid handling system comprising a lid alignment assembly 101, a lid separation assembly 102, a vacuum pickup assembly 103, a pick and place assembly 105 for transporting and placing stacks of lids into trays 131, and a conveyor 107 for conveying trays 131 toward a carton 132.

Figure 2:
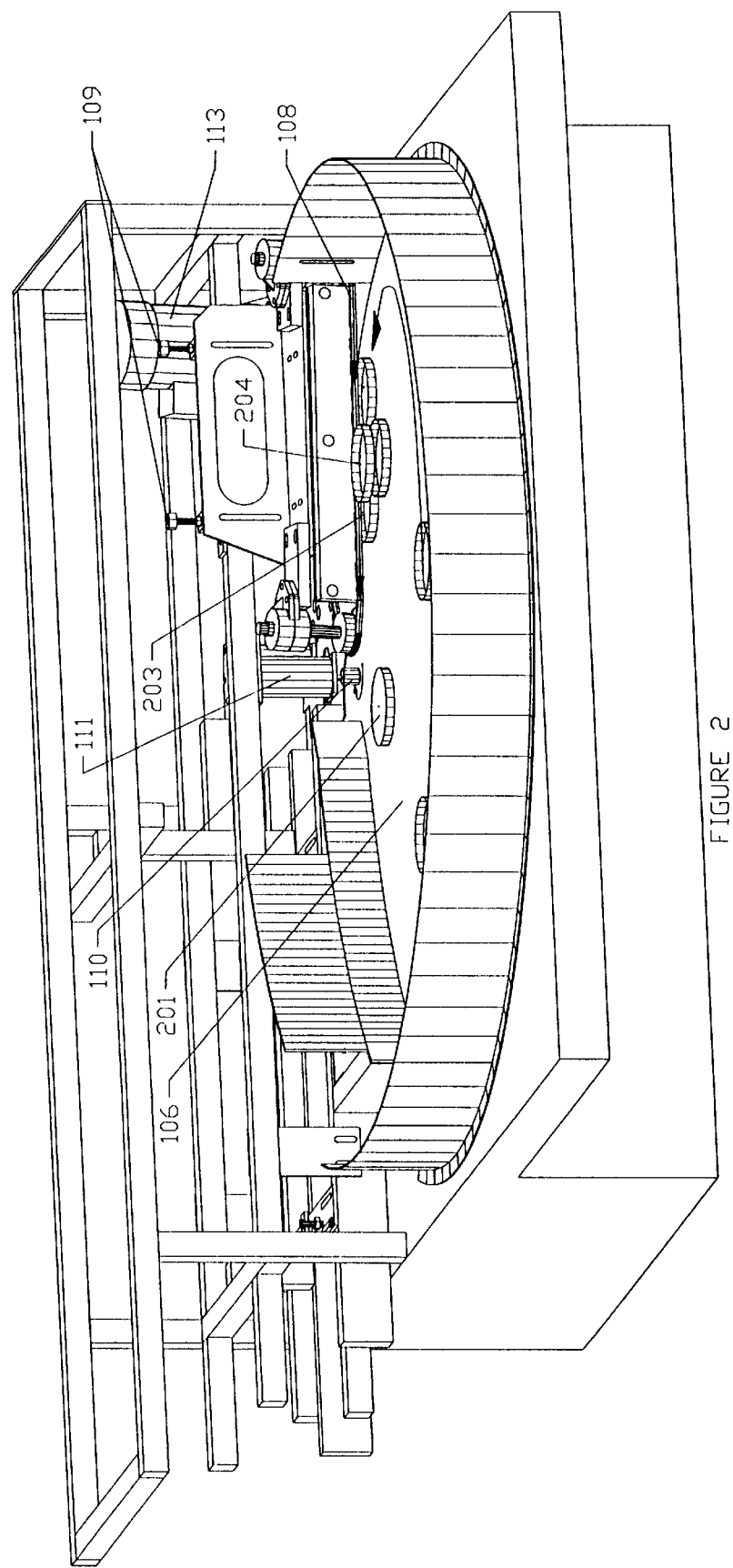
FIG. 2 is a detailed pictorial diagram of the lid alignment assembly of FIG. 1.
Figure 3:
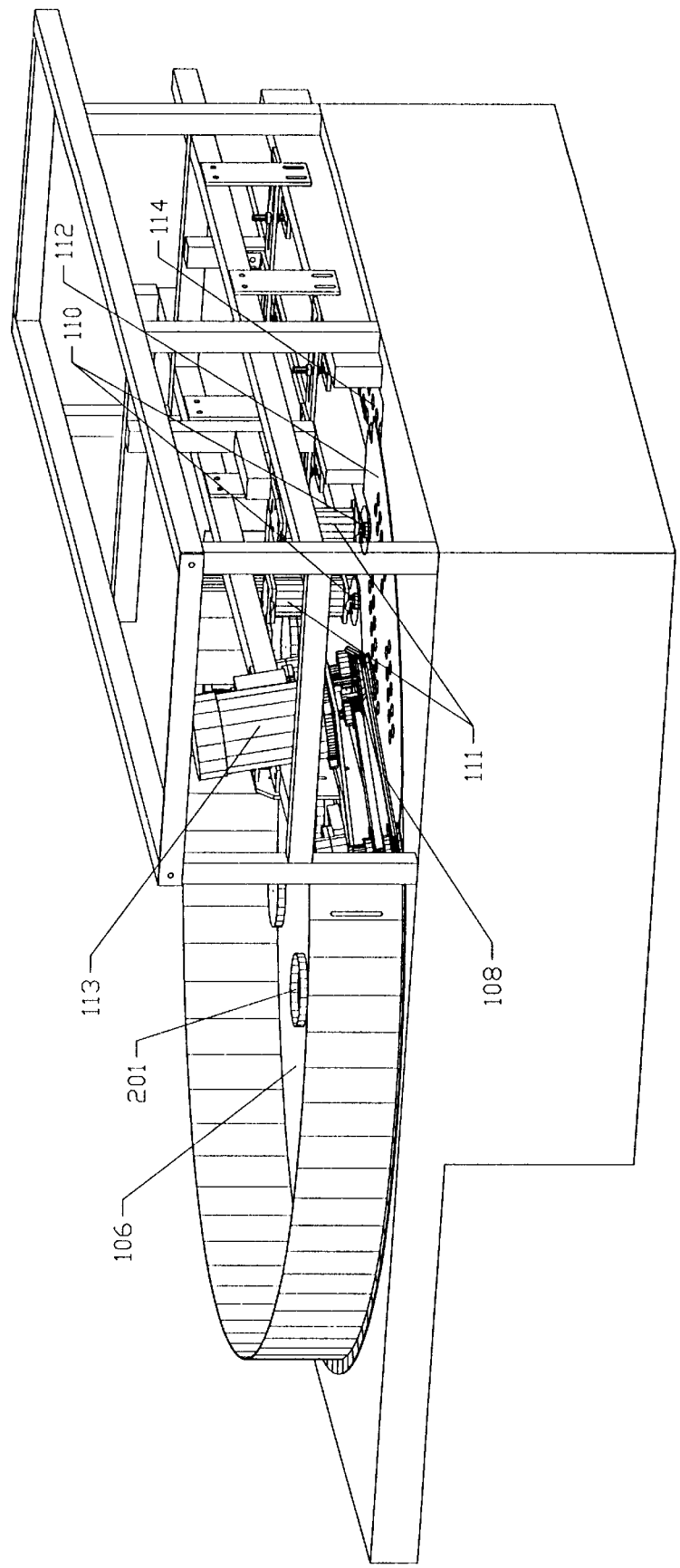
FIG. 3 is an additional detailed pictorial diagram of the lid alignment assembly of FIGS. 1 and 2.
Figure 4:
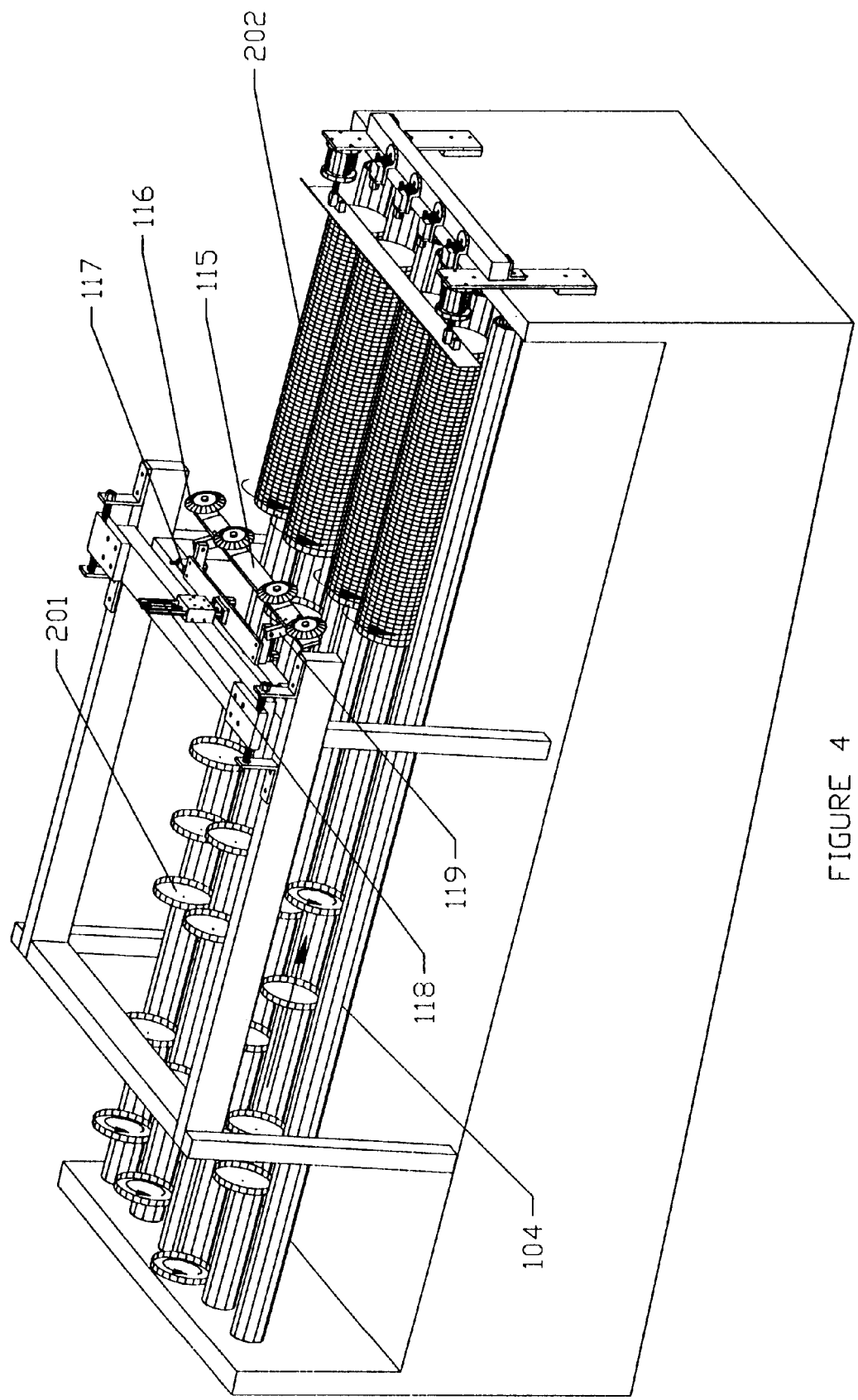
FIG. 4 is a detailed pictorial diagram of the lid separation assembly of FIG. 1, illustrating the position of the separating wheels prior to separation of an accumulated stack of lids on the rotating spin bars.
Figure 5:
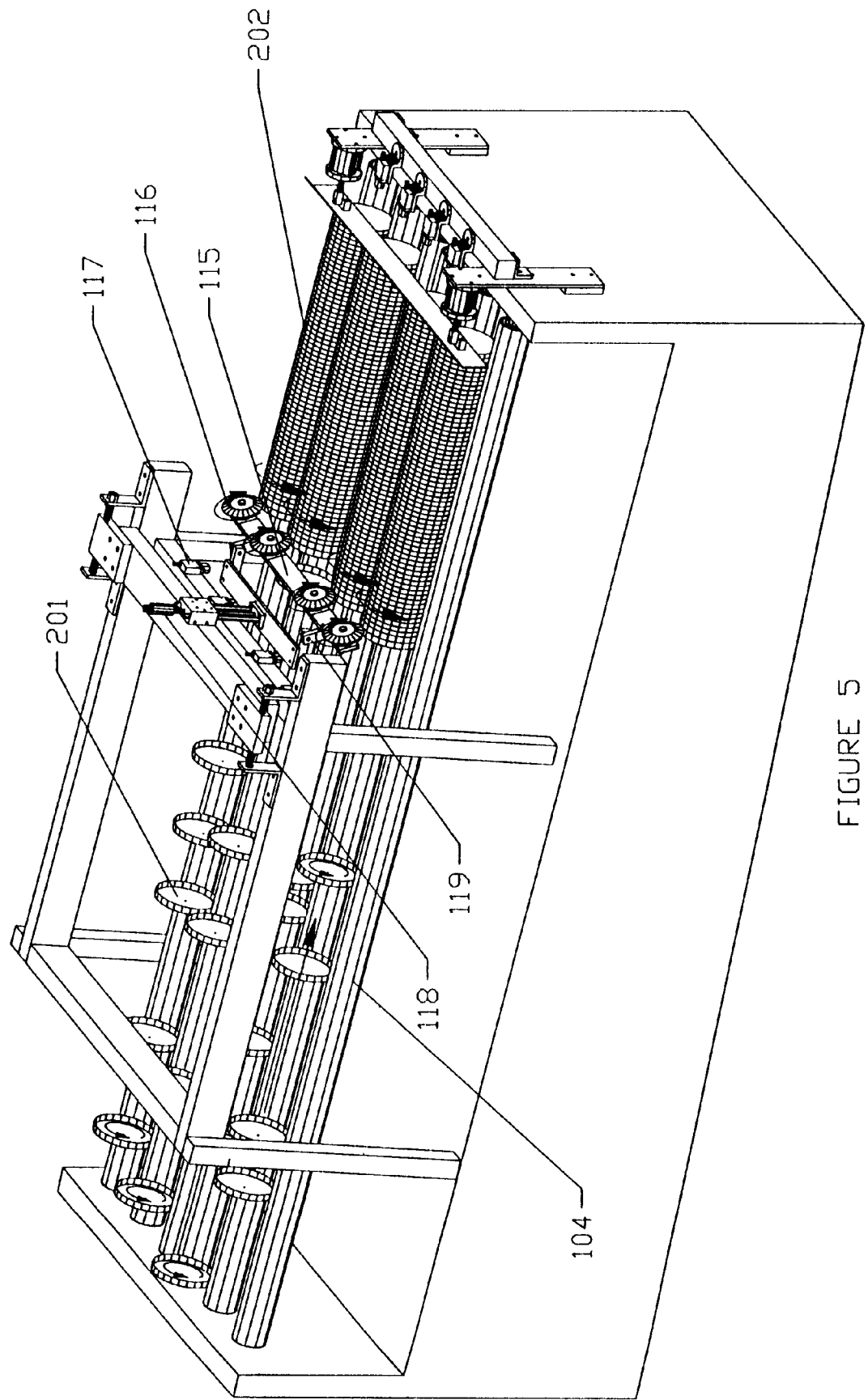
FIG. 5 is a detailed pictorial diagram of the lid separation assembly of FIGS. 1 and 4, illustrating the position of the separating wheels as they engage the rotating stacks of lids during initiation of a lid separation cycle.
Figure 6:
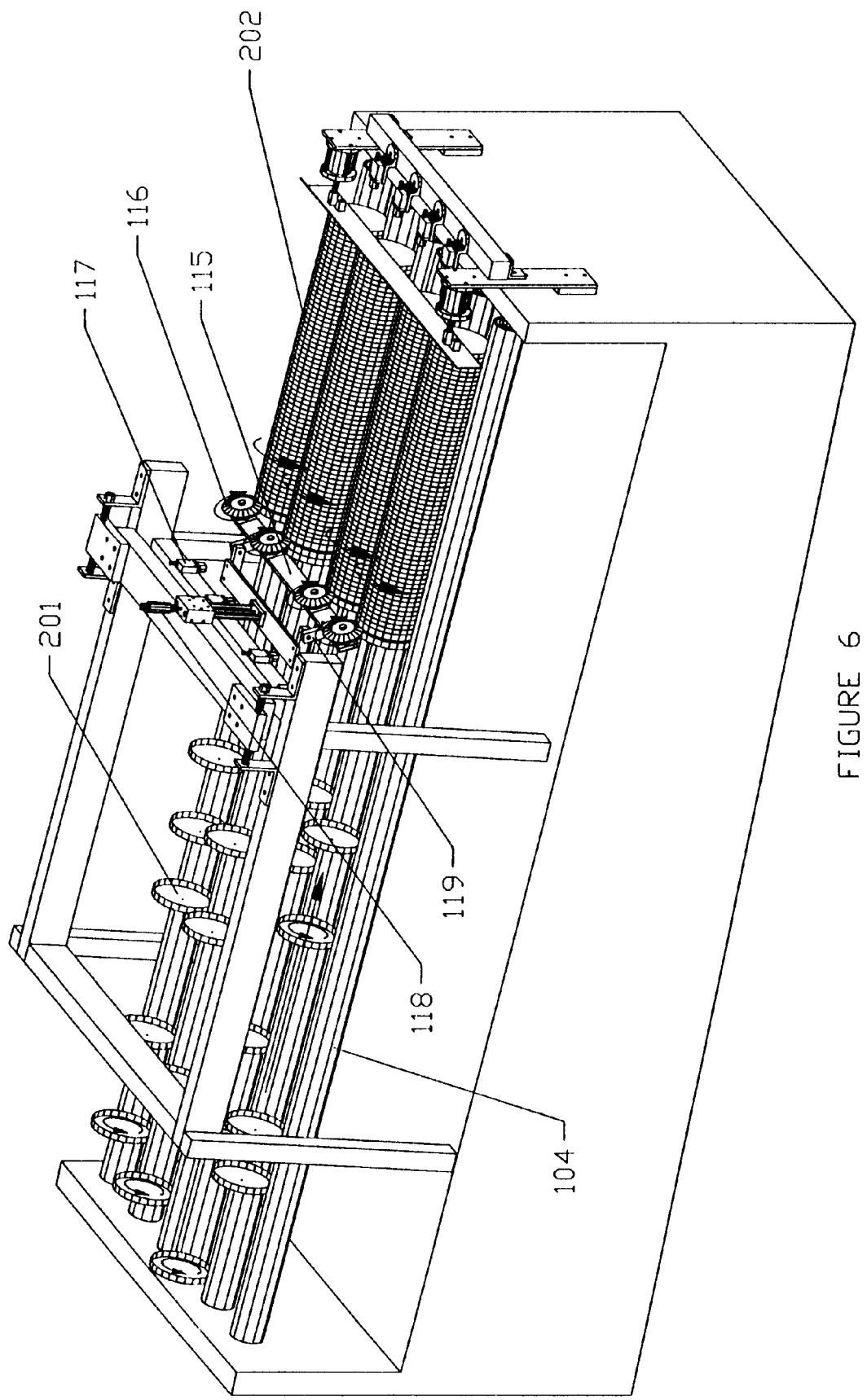
FIG. 6 is a detailed pictorial diagram of the lid separation assembly of FIGS. 1, 4, and 5, illustrating the position of the separating wheels as they completely engage the rotating stacks of lids to complete a lid separation cycle.
Figure 7:
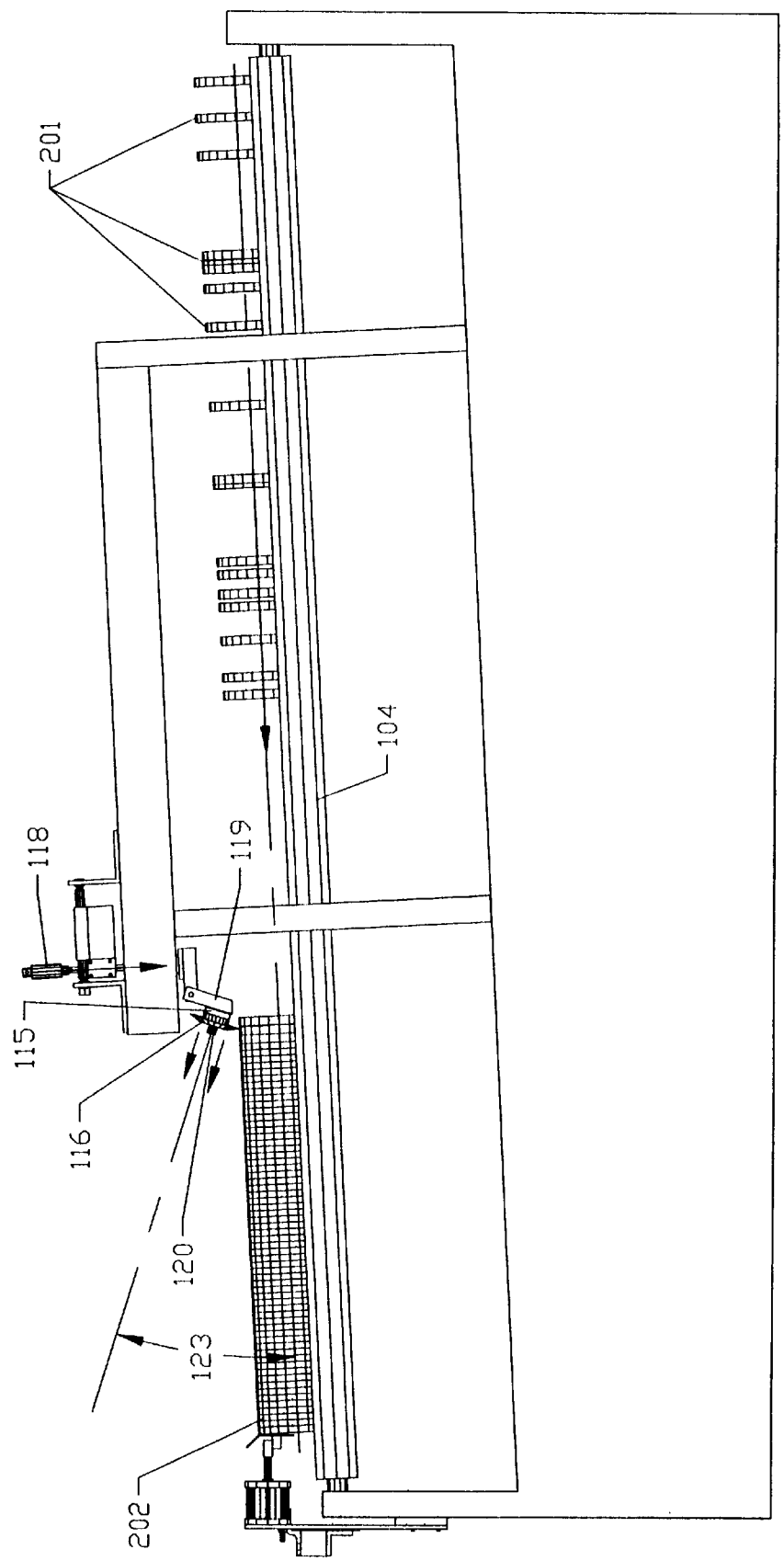
FIG. 7 is a detailed pictorial diagram of a portion of the lid separation assembly of FIGS. 1 and 4–6, illustrating downward and forward movement of one of the separating wheels during a lid separation cycle.
Figure 8:
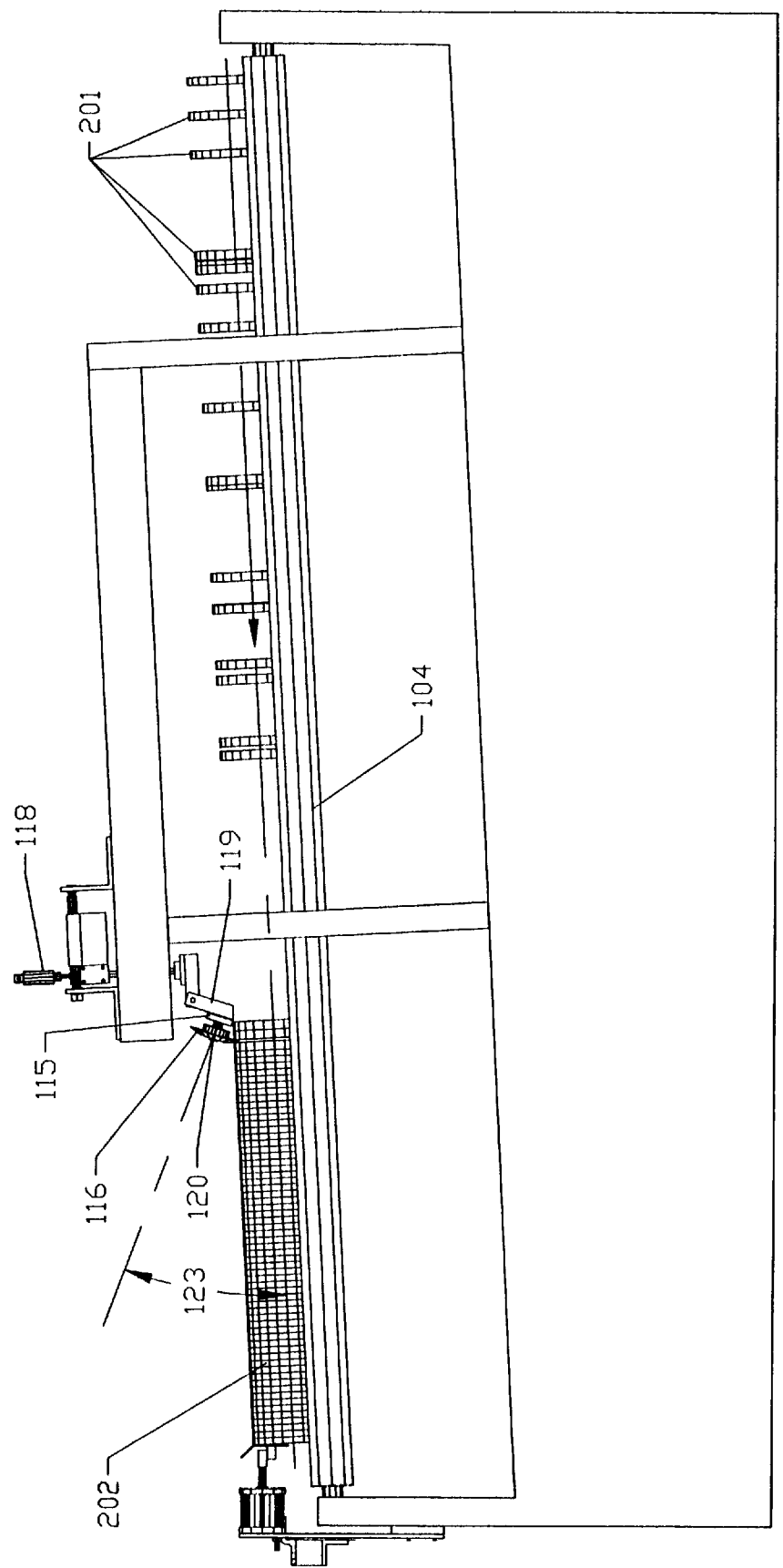
FIG. 8 is a detailed pictorial diagram of a portion of the lid separation assembly of FIGS. 1 and 4–6, illustrating full engagement of one of the separating wheels with a rotating stack of lids.
Figure 9:
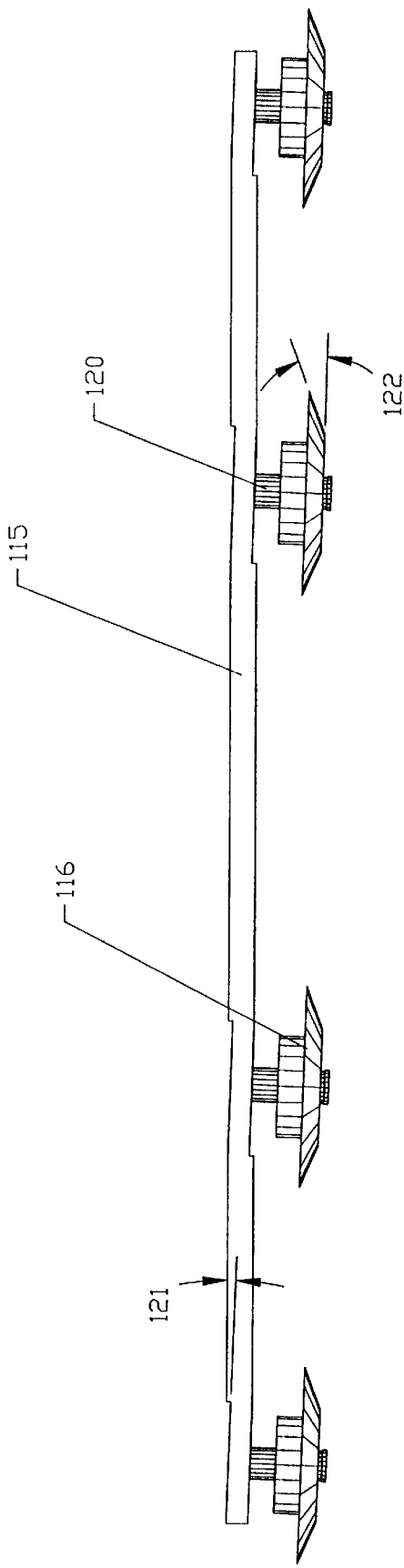
FIG. 9 is a detailed pictorial diagram illustrating the way in which the separating wheels are mounted on a separating wheel bar.

Referring now more specifically to FIGS. 2 and 3, there is shown a horizontally positioned rotating disc 106 that accepts randomly oriented lids 201 that are fed from a conveyor or other conventional device. The centrifugal force of the rotating disc 106 will move lids to the perimeter where they will be driven toward a horizontally positioned moving belt 108. Belt 108 is conventionally driven by a motor 113. The height of the belt 108 above rotating disc 106 can be adjusted by using adjustment screws 109. When the height of belt 108 is adjusted properly, a lid 203 lying flat on disc 106 will slide under belt 108 and exit under plate 112. However, a lid 204 that is randomly positioned on top of another lid 203 will not be able to exit under belt 108, but will instead come in contact with belt 108. Contact between lid 204 and belt 108 will force the lid 204 in the direction in which belt 108 moves. This will allow a lid 204 to recycle around the disc 106 and immediately clear the exit area under belt 108 to allow other lids 201 to exit.

Lids 201 that exit the disc 106 will not necessarily exit in single file. For that reason, it is necessary to separate the lids 201 into one or more lanes or to feed them back onto the disc 106. This is accomplished by means of one or more rotating wheels 110 that are typically driven by motors 111. If a single lane is desired, only one rotating wheel 110 is required, whereas a pair of rotating wheels 110 are required to form two lanes. The ones of lids 201 that do not flow naturally into a lane will contact rotating wheel 110 and be forced sideways into a lane or back onto the disc 106 to be recycled. Once lids 201 are routed into a lane, they are driven to an orientation station by a conveyor belt 114. Subsequent orientation can be accomplished by conventional methods.

Referring now specifically to FIGS. 4–9, there are shown horizontally positioned stacks of lids 202 resting between adjacent rotating spin bars 104 which serve to maintain orientation of the stacks of lids 202. The entry end of the rotating spin bars 104 is slightly elevated so that the spinning lids 201 travel by gravity along the spin bars 104. A separating wheel 116 mounted on shaft 120 is positioned over each stack of lids 202. An angle 123 of the shaft 120 and a bevel angle 112 on separating wheel 116 are both typically 30 degrees, so that the outside surface of bevel angle 122 is approximately perpendicular to stacks of lids 202. A cylinder 118 or other conventional mechanism operates to drive the separating wheel 116 downward so that its contact with the spinning stacks of lids 202 will in turn impart a spinning motion to the separating wheel 116. It is important that the circumference of separating wheel 116 remain in contact with the circumference of the stacks of lids 202 in spite of the downward motion of lid separation assembly 102. Because separating wheel 116 is allowed to slide a limited distance along shaft 120 at angle 123, separating wheel 116 can move relative to separation assembly 102 and thereby remain in contact with the circumference of the stacks of lids 202.

Shaft 120 is preferably mounted laterally with respect to the longitudinal axis of the stacks of lids 202 at an angle 121. This angle 121, typically 2 degrees, causes the force applied by the spinning stack of lids 202 to impart a component of force to the spinning separating wheel 116 that is parallel to shaft 120. Separating wheel 116 is free to slide on shaft 120 until it engages a seam between two adjacent lids 201. At that point, travel of the separating wheel 116 along shaft 120 stops. This insures that separation will occur between two adjacent lids 201 regardless of where the seam between these two lids 201 is located in the stack of lids 202.

Figure 10:
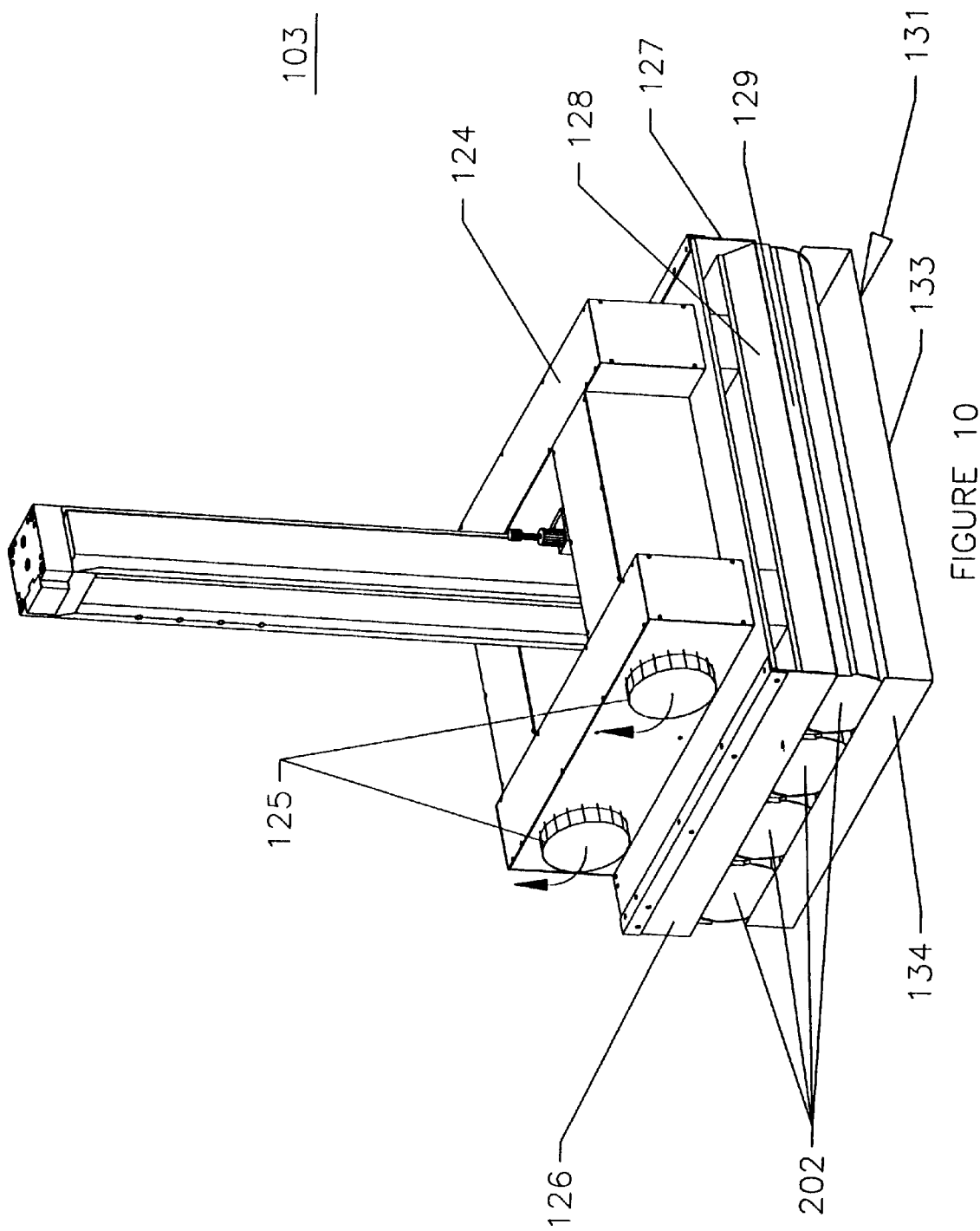
FIG. 10 is a detailed pictorial diagram of the vacuum pickup assembly of FIG. 1.
Figure 11:
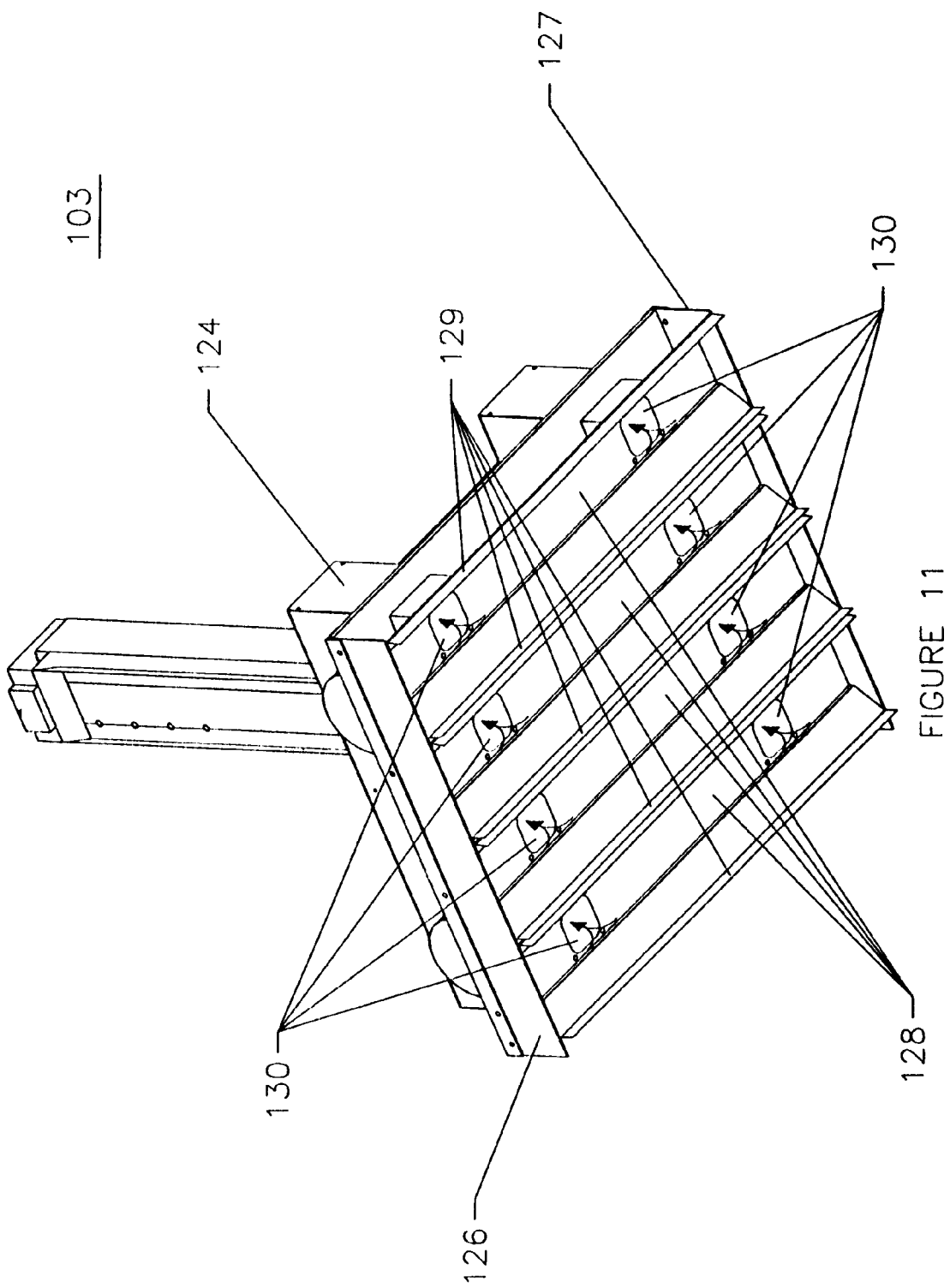
FIG. 11 is a detailed pictorial diagram of the underside of the vacuum pickup assembly of FIGS. 1 and 10, illustrating the vacuum ports and stack receivers.

Referring again to FIG. 1, after counting and separating stacks of lids 202 by lid separation assembly 102, a vacuum pickup assembly 103 is positioned over the stacks of lids 202 on spin bars 104. Referring now additionally to FIGS. 10 and 11, vacuum pickup assembly 103 is positioned over the stacks of lids 202 on spin bars 104. Vacuum is pulled through outlet ports 125 to create a negative pressure in a plenum 124. As the vacuum pickup assembly 103 is lowered onto the stacks of lids 202, a number of stack receivers 128, terminated at their ends by baffles 126 and 127, receive the stacks of lids 202. Stack receivers 128 have a flexible, low-friction material 129, which may comprise commercially available teflon fabric, for example, attached to their side. Material 129 contacts the stacks of lids 202 to thereby create a seal for vacuum without mis-aligning the stacks of lids 202. Vacuum drawn through inlet ports 130 imparts a negative pressure in the stack receivers 128, causing the stack of lids 202 to be lifted into the respective stack receivers 128. The entire vacuum pickup assembly 103 can be translated either vertically or horizontally by conventional means to the stacks of lids 202.

To release the stacks of lids 202 onto a tray 131 or onto conveyor 107, vacuum at inlet ports 130 is released. Trays 131 are placed on conveyor 107 so that they are immediately adjacent to each other. Each of the trays 131 is typically fabricated of cardboard so that its bottom surface 133 can serve to replace the traditional cardboard divider that is typically inserted into a carton 132 to separate the layers of lids 202. Tray 131 also includes a pair of side flaps 134 to help maintain alignment of individual lids 201 that are located at the ends of the stacks of lids 202. End flaps 134 are typically angled upward at approximately 85 degrees initially to facilitate placement of the stacks of lids 202 by vacuum pickup assembly 103 from above. After the stacks of lids 202 are placed onto tray 131, conveyor 107 moves a distance equal to the width of vacuum pickup assembly 103. The next transfer of stacks of lids 202 by vacuum pickup assembly 103 will place those stacks of lids 202 immediately adjacent to the previous stacks of lids 202. This technique allows the vacuum pickup assembly 103 to simultaneously place the stacks of lids 202 into two adjacent trays 131. This is an important feature, in the event that the number of stacks of lids 202 required to fill a tray 131 is different than the number of stacks of lids 202 delivered by vacuum pickup assembly 103.

As filled trays 131 move along conveyor 107, a pair of fixed side guides 135 are slightly angled toward each other to apply more pressure to side flaps 134. This will cause the angles of side flaps 134 to increase from approximately 85 degrees to 90 degrees, thus applying pressure to the stacks of lids 202 contained in the filled trays 131 to insure that they remain completely aligned.

Side guides 135 may be extended beyond conveyor 107 to maintain pressure on side flaps 134 during subsequent manual or automatic placement of the filled trays 131 into carton 132. As each filled tray 131 is lowered into carton 132, side flaps 134 will protect the lids 201 located at the ends of the stacks of lids 202 from contacting a plastic liner inside carton 132, if such a liner is used. This allows tray 131 to be properly placed into carton 132 without disturbing the stacks of lids 202.

What is claimed is:

1. Apparatus for transporting horizontally positioned adjacent stacks of lids, the apparatus comprising:

a vacuum pickup assembly;

means for moving the vacuum pickup assembly horizontally and vertically;

conveyor means positioned adjacent the vacuum pickup assembly;

a plurality of trays positioned adjacent each other on the conveyor means, each of the trays comprising a bottom member and two upwardly formed side members, each of the trays arranged for receiving a single layer of stacks of lids from said vacuum pickup assembly; and a guide member mounted on each side of the conveyor means for contacting the side members of the plurality of trays to maintain pressure on said side members as the trays move along the conveyor means;

the vacuum pickup assembly having a number of longitudinally partitioned stack receivers on an underside thereof, each of the stack receivers having a baffle at each end thereof, and each of the stack receivers having vacuum ports associated therewith such that when the vacuum pickup assembly is lowered over the horizontally positioned adjacent stacks of lids the stacks of lids are lifted by vacuum into position for retention within corresponding ones of the stack receivers.

2. Apparatus for transporting horizontally positioned adjacent stacks of lids as in claim 1, further comprising strips of a flexible material depending from the underside of the vacuum pickup assembly, a pair of said strips of flexible material being associated with each of the stack receivers for contacting a stack of lids retained therein to thereby provide a vacuum seal.

3. A method for transporting horizontally positioned adjacent stacks of lids, the method comprising:

providing a vacuum pickup assembly having a number of longitudinally partitioned stack receivers on an underside thereof, each of the stack receivers having a baffle at each end thereof, and each of the stack receivers having vacuum ports associated therewith;

lowering the vacuum pickup assembly over the horizontally positioned adjacent stacks of lids to thereby lift the stacks of lids by vacuum into position for retention within corresponding ones of the stack receivers, providing a conveyor adjacent the vacuum pickup assembly;

providing a plurality of trays positioned adjacent each other on the conveyor, each of the trays comprising a bottom member and two upwardly formed side members;

releasing the stacks of lids retained within the stack receivers of said vacuum pickup assembly onto one or more of the plurality of trays to form a single layer of horizontally positioned adjacent stacks of lids thereon; and providing a guide member on each side of the conveyor for contacting the side members of the plurality of trays to maintain pressure on said side members as the trays move along the conveyor.

* * * * *